US009094738B2

(12) United States Patent
Kishore

(10) Patent No.: US 9,094,738 B2
(45) Date of Patent: Jul. 28, 2015

(54) APPARATUS, SYSTEMS AND METHODS FOR PRESENTING HIGHLIGHTS OF A MEDIA CONTENT EVENT

(75) Inventor: Nandury V. Kishore, Bangalore (IN)

(73) Assignee: Sling Media PVT LDT, Bangalore (IN)

( * ) Notice: Subject to any disclaimer, the term of this patent is extended or adjusted under 35 U.S.C. 154(b) by 0 days.

(21) Appl. No.: 14/124,412

(22) PCT Filed: Jun. 8, 2011

(86) PCT No.: PCT/IN2011/000384
§ 371 (c)(1),
(2), (4) Date: Dec. 6, 2013

(87) PCT Pub. No.: WO2012/168943
PCT Pub. Date: Dec. 13, 2012

(65) Prior Publication Data
US 2014/0101707 A1   Apr. 10, 2014

(51) Int. Cl.
*H04N 7/173* (2011.01)
*H04N 21/8549* (2011.01)
*H04N 21/472* (2011.01)
*H04N 21/2343* (2011.01)
*H04N 21/845* (2011.01)
*G11B 27/10* (2006.01)
*H04N 5/44* (2011.01)
*H04N 5/76* (2006.01)

(52) U.S. Cl.
CPC ............ *H04N 21/8549* (2013.01); *G11B 27/10* (2013.01); *H04N 5/4403* (2013.01); *H04N 21/23439* (2013.01); *H04N 21/47202* (2013.01); *H04N 21/8456* (2013.01); *H04N 5/76* (2013.01)

(58) Field of Classification Search
None
See application file for complete search history.

(56) References Cited

U.S. PATENT DOCUMENTS

| 8,386,935 B2* | 2/2013 | van Zwol et al. ............. 715/723 |
| 2003/0093790 A1 | 5/2003 | Logan et al. |
| 2005/0097621 A1* | 5/2005 | Wallace et al. ............... 725/135 |
| 2007/0101369 A1 | 5/2007 | Dolph |
| 2009/0177792 A1* | 7/2009 | Guo et al. ...................... 709/231 |
| 2012/0259924 A1* | 10/2012 | Patil et al. ..................... 709/206 |

FOREIGN PATENT DOCUMENTS

| EP | 1100271 A2 | 5/2001 |
| EP | 1534014 A2 | 5/2005 |
| WO | 03/092258 A2 | 11/2003 |
| WO | WO 03/092258 A2 * | 11/2003 |
| WO | 2005/103954 A1 | 11/2005 |

\* cited by examiner

*Primary Examiner* — John Schnurr
*Assistant Examiner* — Cynthia Fogg
(74) *Attorney, Agent, or Firm* — Lowe Graham Jones PLLC

(57) ABSTRACT

Systems and methods are operable to present summaries of a media content event. An exemplary embodiment receives a media content stream having at least one media content event, receives a summary feed stream having at least one media content event summary segment associated with the received at least one media content event, receives a user request for presentation of the media content event summary residing in the received at least one media content event summary segment, ends or pauses presentation of the media content event on a media presentation device, and presents the media content event summary of the media content event summary segment on the media presentation device.

18 Claims, 4 Drawing Sheets

APPARATUS, SYSTEMS AND METHODS FOR PRESENTING HIGHLIGHTS OF A MEDIA CONTENT EVENT

PRIORITY CLAIM

This application is a §371 National Stage Application of International Application No. PCT/IN2011/000384, filed Jun. 8, 2011, and entitled "APPARATUS, SYSTEMS AND METHODS FOR PRESENTING HIGHLIGHTS OF A MEDIA CONTENT EVENT." Accordingly, the present application claims priority to and the benefit of the filing date of International Application No. PCT/IN2011/000384, which is incorporated herein by reference in its entirety.

BACKGROUND

Media devices, such as a set top box, stereo, television, computer system, game system, or the like, are often configured to present a plurality of different media content events, such as television programs, movies, news broadcast programs, sporting events, and the like that are produced by different media content producers. The plurality of media content events are aggregated together and are broadcast out to many connected media devices over a broadcast system by a media content provider.

At any given time, a plurality of media content are being currently broadcast out over the broadcast network. The user is able to selectively view a media content event of interest by selecting an associated "channel" that the media content event of interest is currently being presented on.

However, often the user selects the media content event of interest for viewing after it starts in live transmission. Accordingly, the user is not able to view the initial portion of the media content event of interest since it has already been broadcast out over the broadcast network to which the media device is connected to. Accordingly, there is a need in the arts to indicate missed media content associated with the missed initial portion of the media content event of interest.

SUMMARY

Systems and methods of are presenting a summary of a media content event are disclosed. An exemplary embodiment receives a media content stream having at least one media content event, receives a summary feed stream having at least one summary segment associated with at least one media content event, receives a user request for presentation of the media content event summary residing in the received at least one media content event summary segment, ends presentation of the media content event on a media presentation device, and presents media content event summary of the media content event summary segment on the media presentation device.

BRIEF DESCRIPTION OF THE DRAWINGS

Preferred and alternative embodiments are described in detail below with reference to the following drawings.

DETAILED DESCRIPTION

Figure 1:
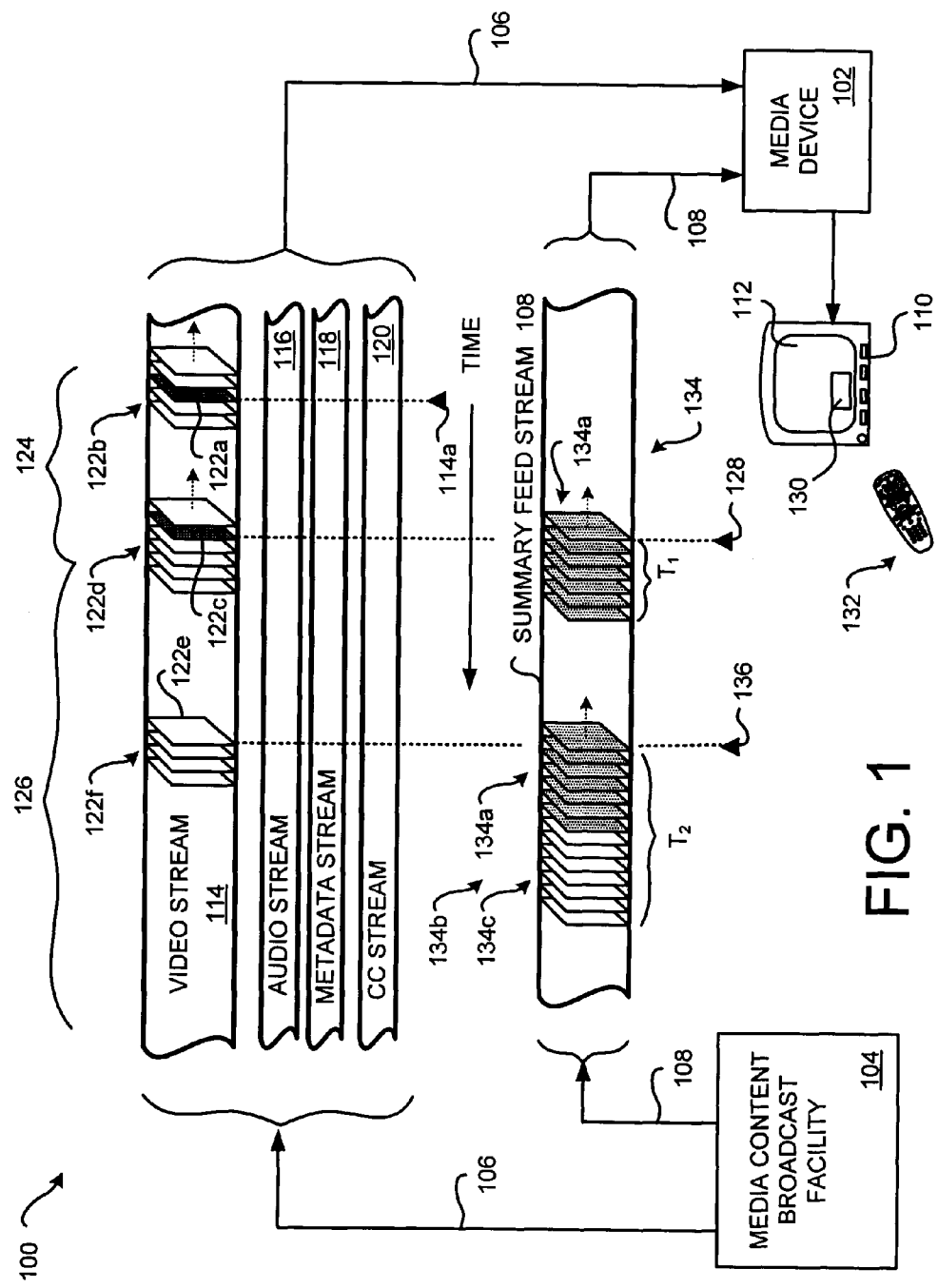
FIG. 1 is a block diagram of an embodiment of a media content event summary feed system implemented in a media device and in a media content broadcast facility.

FIG. 1 is a block diagram of an embodiment of a media content event summary feed system 100 implemented in a media device 102 and in a media content broadcast facility 104. Examples of the media device 102 include, but are not limited to, a set top box (STB), a television (TV), a digital video disc (DVD) player, a digital video recorder (DVR), a game playing device, a mobile media device, a smart phone, or a personal computer (PC) that are configured to receive a broadcast of at least one media content event from the media content broadcast facility 104.

FIG. 1 conceptually illustrates communication of a media content stream 106 and a summary feed stream 108 communicated from the media content broadcast facility 104 to the media device 102. In FIG. 1, "time" is conceptually illustrated a "moving" from the right to the left. That is, information that is first communicated in the media content stream 106 and/or the summary feed stream 108 is to the right hand side of FIG. 1. Later information is subsequently communicated moving towards the left hand side of FIG. 1.

When the user of the media device 102 selects a particular media content event of interest, the selected media content event of interest is communicated to and is presented on a media presentation device 110, such as, but not limited to, a television (TV), a monitor, a PC or other device. The video portion of the media content event of interest is presented on the display 112 of the media presentation device 110. In some embodiments, the media device 102 and the media presentation device 110 are integrated together into a single electronic device.

In situations where the user begins presentation of the selected media content event after it has started, the user will not be able to view the missed portion of the selected media content event. However, the user may be interested in viewing the summary of the missed portion of the selected media content event so that the user may appreciate the subject matter of the missed portion of the selected media content event. The summary of the media content denotes the aggregate of parts of the media content which effectively summarizes/describes significant events of the media content event. For example, for football content, the summary is contain video clips of goals, hits, and/or misses of the game, as well as any other action which would be normally considered as a part of summary.

Embodiments of the media content event summary feed system 100 are configured to allow the user to select the summary feed stream 108 which comprises a series of media content event summary segments. Upon selection of the summary feed stream 108 for presentation, the media device 102 processes the summary feed stream 108 such that a current media content event summary segment is presented on the media presentation device 110. In an exemplary embodiment, the media content event summary segments are a series of short video clips that effectively summarize portions of the missed portion of the selected media content event. Upon conclusion of the presented series of summaries, presentation of the rest of the selected media content event begins or resumes.

For example, the user may select a football game for presentation. In situations where the user has missed the initial portion of the football game, the summary feed stream 108 provides a media content event summary segment that presents a summary of key plays that have already happened during the football game. For example, scoring plays, or plays where a player is injured, may be used to generate a relatively short summary video clips that are sequentially presented to the user. Upon presentation of the series of summary video clips, the user has a better appreciation of the progression of the football game from its beginning up to its current presentation time.

As another example, the user may select a news broadcast program for presentation. In situations where the user has missed portion of the news broadcast, the summary feed stream 108 provides media content event summary segment that presents a series of brief summaries of each news report segment presented in the missed portion of the news broadcast. For example, a previously presented segment describing a newsworthy event may be used to generate a relatively short summary video clip that summarizes the segment. Upon presentation of the series of summary video clips, the user will have a better appreciation of the various presented segments of the news broadcast program from its beginning up to its current presentation time.

To facilitate a conceptual explanation of the various embodiments, the exemplary media content stream 106 is described as comprising a video stream 114, an audio stream 116, an optional metadata stream 118, and an optional closed captioning (CC) stream 120. The conceptual video stream 114 comprises a series of video frames 122 which are serially presented on the display 112 of the media presentation device 110. The conceptual audio steam 116 comprises the audio portion, or sound track, of the media content event of interest. The audio portion of the media content event of interest is reproduced as sounds by speakers of the exemplary media presentation device 110. Presentation of the video stream 114 and the audio stream 116 are synchronized such that the user is able to synchronously view the video portion and hear the audio portion of the media content event of interest.

The media content stream 106 may optionally comprise a metadata stream 118 that provides supplemental information of interest that pertains to the media content event. For example, the conceptual metadata stream 18 may include information describing the media content event. Further, the media content stream 106 may optionally comprise a closed captioning stream 120 that is a textual description of the audio portion of the media content event. For example, the text of the conceptual closed captioning stream 120 may be presented at a selected location on the display 112.

Any suitable format for the media content stream 106 may be employed by the various embodiments. For example, the media content stream 106 may use one of the formats defined by the Motion Pictures Expert Group (MPEG). Some formats may combine or interleave the conceptually described video stream 114, audio stream 116, metadata stream 118, and closed captioning stream 120 into a single stream of data.

To further conceptually describe the media content stream 106, the video stream is described as comprising a series of video frames 122. At the start of the media content event, a first video frame 122a is received in the video stream 114. If the media content event has been selected for presentation by the user, the first video frame 122a is processed by the media device 102 and is then presented on the display 112 of the media presentation device 110. Subsequently received video frames 122b are then processed and presented.

However, in situations where the user selects the media content event after its start, an initial portion 124 of the selected media content event cannot be presented because the video frames 122a-122b have already been broadcast from the media content broadcast facility 104. At most, the user may be presented the remaining portion 126 of the selected media content event.

For example, FIG. 1 illustrates a selection time 128 that corresponds to a point where the user selects the media content event for presentation. At the time 128, a video frame 122c may be processed by the media device 102 for presentation. Subsequently received video frames 122d of the remaining portion 126 are then received, processed, and presented to the user.

However, the user may be interested in accessing and viewing the media content event summary prior to watching the remaining portion 126 of the selected media content event. Embodiments of the media content event summary feed system 100 are configured to respond to a user request to view the media content event summary. Upon receiving a user request for the media content event summary, embodiments are configured to access the current media content event summary segment in the summary feed stream 108. The accessed media content event summary segment comprises a series of media content event summaries that are presented to the user.

Figure 2:
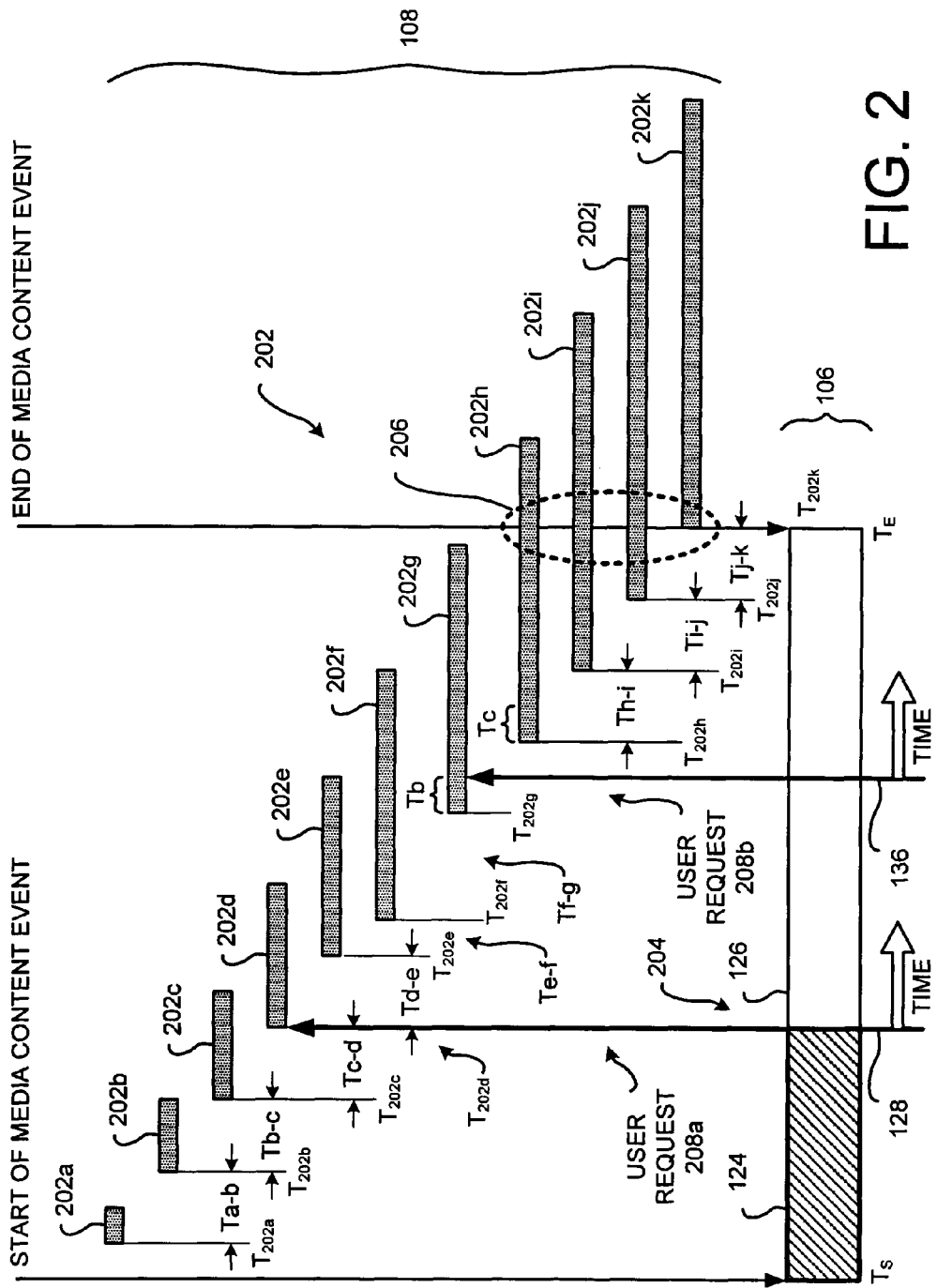
FIG. 2 is a diagram illustrating a plurality of conceptual media content event summary segments and a conceptual media content event.

During presentation of the media content event summaries, embodiments may be optionally configured to end, at least for a time, presentation of the media content event 204 (FIG. 2). The media device may end presentation of the media content event by pausing the media content event. Further, the media device 102 may store the remaining portion 126 of the selected media content event as it is being received in the media content stream 106. Accordingly, upon conclusion of the presentation of the current media content event summary segment, presentation of the remaining portion 126 of the selected media content event may begin or may be resumed from the pause point or stored point of the selected media content event. Some embodiments may be configured to resume presentation of the media content event based on content in the currently received media content stream 106.

In the various embodiments, user selection of presentation of the media content event summary segment is facilitated in a variety of manners. For example, an exemplary embodiment presents a relatively small summary selection icon 130, such as pop-up icon, a selection pane, or the like, on the display 112 of the media presentation device 110. The user, by operating their remote control 132, may select the presented icon 130. Alternatively, or additionally, a predefined controller on the surface of the remote control 132 may be used to initiate presentation of the media content event summary segment. Some embodiments may be configured to present a graphical user interface menu or the like on the display 112 such that the user, using the remote control 132 or other suitable user interface, may navigate about so as to select and initiate presentation of the media content event summary segment. Some embodiments may have a speech recording and recognition device in the remote control, which can record and identify suitable voice command and initiate the presentation of summary segment.

Returning to the situation wherein the user selects the media content event at the selection time 128, the user may initiate presentation of the media content event summary segment. The media content event summary segment resides in the received summary feed stream 108. The summary feed stream 108 is conceptually illustrated as a video stream comprising a plurality of serially communicated video frames 134. The summary feed stream 108 may further include a conceptual audio stream (not shown), an optional metadata stream (not shown), and/or an optional closed captioning stream (not shown). Any suitable format for the summary feed stream 108 may be employed by the various embodiments. For example, the summary feed stream 108 may use one of the formats defined by the Motion Pictures Expert Group (MPEG). Some formats may combine or interleave the conceptual video stream, audio stream, metadata stream, and/or closed captioning stream into a single stream of data. In some embodiments, the media content stream 106 and the summary feed stream 108 are received in a single stream of media content.

Accordingly, at the time 128, a plurality of video frames 134a are accessed from the summary feed stream 108. The video frames 134a correspond to a series of summary video clips that are associated with the missed initial portion 124 of the selected media content event. The video frames 134a are processed by the media device 102 for presentation on the display 112. The number of video frames 134a, in an exemplary embodiment, are limited such that the media content event summary segment is presented to the user during a first duration 7(T1).

As the media content event progresses in time, other portions of the media content event may be used to generate additional summary video clips that are incorporated into a subsequent media content event summary segment. Thus, the duration of the media content event summary segments increase as the remaining portion 126 of the selected media content event is communicated to the media device 102 in the media content stream 106.

For example, the user may select the media content event at a later selection time 136. Here, the video frame 122e is available for presentation. Subsequently received video frames 122f may then be received, processed, and presented.

Alternatively, at that time 136, the user may initiate presentation of the media content event current media content event summary segment. Accordingly, at the time 136, a plurality of video frames 134b are accessed from the current media content event summary segment in the received summary feed stream 108. The video frames 134b correspond to a series of summary video clips that are associated with the missed initial portion 124 of the selected media content event up through time 136.

In an exemplary embodiment, the video frames 134b may comprise the previously generated video frames 134a and a new plurality of video frames 134c. The video frames 134c correspond to summary video clips that were generated from the media content event between the time 128 and the time 136. The video frames 134a are processed by the media device 102 for presentation on the display 112. The number of video frames 134b, in an exemplary embodiment, are increased such that the subsequent media content event summary segment is presented over a first duration (T2). That is, as the media presentation event progresses from time 128 to the later time 136, new summary video clips are generated and are then added into the current media content event summary segment.

FIG. 2 is a diagram illustrating a plurality of conceptual media content event summary segments 202 and a conceptual media content event 204. In an exemplary embodiment, the plurality of media content event summary segments 202 are communicated in the summary feed stream 108. The exemplary media content event 204 is communicated in the media content stream 106. In FIG. 2, "time" is conceptually illustrated "moving" from the left hand side to the right hand side of FIG. 2. That is, media content information that is first communicated in the media content stream 106 and/or the summary feed stream 108 is illustrated at the left hand side of FIG. 2. Later communicated media content information is subsequently illustrated towards the right hand side of FIG. 2.

The start of the media content event is conceptually illustrated as beginning at a start time (Ts). The media content event 204 is communicated from the media content broadcast facility 104 to a plurality of media devices 102 in a streaming fashion, where the end of the media content event 204 is shown at an end time (Te).

A plurality of media content event summary segments 202a-202k are conceptually illustrated in temporal relationship to the relative time of communication of the media content event 204. For example, at the start time (Ts), there is no media content event summary segment being communicated in the summary feed stream 108 because, at this point in time, there have been no events of interest from which to generate a media content event summary.

At some later time (conceptually shown at $T_{202a}$), a first media content event summary segment 202a is communicated in the summary feed stream 108. At this point in time, there has been at least one media content event of interest from which to generate a media content event summary. (If additional media content events of interest have occurred in the media content event 204, the media content event summary segment 202a would further include media content event summaries associated with those additional media content events of interest.)

At a later time (conceptually shown at $T_{202b}$), a second media content event summary segment 202b is communicated in the summary feed stream 108. At this point in time, there have been other media content events of interest from which to generate new media content event summaries. In an exemplary embodiment, the second media content event summary segment 202a is generated by adding the new media content event summaries to the one or more media content event summaries that were included in the first media content event summary segment 202a.

Similarly, at a further later time (conceptually shown at $T_{202c}$), a third media content event summary segment 202c is communicated in the summary feed stream 108. At this point in time, there have been other new media content events of interest from which to generate new media content event summaries. In an exemplary embodiment, the third media content event summary segment 202c is generated by adding the new media content event summaries to the media content event summaries that were included in the second media content event summary segment 202b (which also included the media content event summaries of the first media content event summary segment 202a).

Media content event summary segments are constructed by first generating a media content event summary from the portion of the media content event 204 that is associated with a particular media content event of interest. In an exemplary embodiment, a short summary video clip is generated about the time span of the media content event of interest. If there are a plurality of media content events of interest, a corresponding number of summary video clips would be generated.

The duration of the generated summary video clips may be the same, or they may be different. For example, the summary video clip durations may be predefined. Alternatively, or additionally, the summary video clip durations may vary. For example, a more interesting media content event of interest, and/or a longer duration media content event of interest, may have a longer associated summary video clip. In some embodiments, the generated summary video clip may be augmented with supplemental information, such as, but not limited to, added commentary, added music, added graphics, or the like.

Each of the generated summary video clips are then added into the media content event summary segment 202 in a serial fashion. Preferably, the temporal sequence of the summary video clips corresponds to the sequence of events of the media content event 204. When a segment duration ends, the construction of the media content event summary segment 202 is concluded. The constructed media content event summary segment 202 may then be communicated to the plurality of media devices 102.

The process of constructing subsequent media content event summary segments, and their attendant communication in the summary feed stream 108, continues up to the end of the media content event, denoted at the time Te. At or near the end time Te, a last media content event summary segment 202k is communicated in the summary feed stream 108.

As conceptually illustrated in FIG. 2, the duration of each of the media content event summary segments 202a-202k increases with each subsequently communicated media content event summary segment 202. The first media content event summary segment 202a has a relatively short duration since there will be relatively few media content events that are suitable for generating media content event summaries. For example, if the media content event 204 is a football game, the first media content event summary segment 202a may comprise the introduction of the players to the audience and/or the opening play.

In the situation where a score is made by one team between the times $T_{202a}$ and $T_{202b}$, a media content event summary may be generated based upon the scoring play, or even one or more preceding plays that facilitated the scoring play. This media content event summary is added to the media content event summaries of the first media content event summary segment 202a to construct the second media content event summary segment 202b. Thus, in this example, the duration of the second media content event summary segment 202b is greater than the duration of the first media content event summary segment 202a (as conceptually illustrated by the longer length of the illustrated "bar" representing the second media content event summary segment 202b).

However, in situations where there were no media content events of interest in the media content event 204 between the times $T_{202a}$ and $T_{202b}$, the duration of the second media content event summary segment 202b would be the same, or substantially the same, as the first media content event summary segment 202a. In some embodiments, the first media content event summary segment 202a may be re-communicated (rather than generating a new second media content event summary segment 202b that is substantially the same as the first media content event summary segment 202a).

In some embodiments, where a particular media content event summary segment 202 concludes prior to the start of the next media content event summary segment 202, that particular media content event summary segment 202 may be saved for presentation in the event that the user request presentation of the media content event summaries prior to receipt of the next media content event summary segment 202. Accordingly, the saved media content event summary segment may be immediately presented to the user.

In an exemplary embodiment, the duration of each of the individual media content event summary segments 202a-202k will vary based upon the number, and the respective duration, of each of the individual media content event summaries that are used to construct each of the media content event summary segments 202a-202k. Generally, later constructed media content event summary segments 202 will have a longer duration than previously constructed media content event summary segments 202 due to the occurrence of additional media content events of interest in the media content event 204.

In some embodiments, a maximum duration of a media content event summary segment 202 may be predefined so as to limit the presentation time (duration) of an individual media content event summary segment 202. In such situations, selected ones of the media content event summaries may be deleted or otherwise omitted from the next constructed media content event summary segment 202. Alternatively, or additionally, one or more selected media content event summaries may be condensed or otherwise have its duration reduced, wherein the condensed media content event summary is included in the newly constructed media content event summary segment 202. For example, previous video frames 134a (FIG. 1) of a previously used media content event summary may be discarded to limit duration of a media content event summary segment 202.

As conceptually illustrated in FIG. 2, a second media content event summary segment 202b is communicated at a later time ($T202b$) after communication of the first media content event summary segment 202a. A separation duration, or time separation, between communication of the second media content event summary segment 202b and the first media content event summary segment 202a is conceptually indicated by the separation duration Ta-b.

In an exemplary embodiment, the separation durations are predefined at a constant value such that the series of media content event summary segments 202a-202k are periodically communicated at intervals as defined by the separation durations or some other suitable temporal metric. That is, each of the media content event summary segments 202a-202k are periodically communicated in the summary feed stream 108. Such an embodiment provides for a relatively more efficient process of constructing and communicating the series of media content event summary segments 202a-202k.

Alternatively, or additionally, the separation duration between any two media content event summary segments 202 may be varied such that the start times of the successive media content event summary segments 202 are not periodically separated by a constant predefined duration. For example, the media content stream 106 may have commercials or the like for which no media content event summary would be generated. Or, there may simply be no events of interest from which a media content event summary would be otherwise generated. Accordingly, communication of the next media content event summary segment 202 may be delayed.

Alternatively, there may be a relatively large number of media content events of interest that occur in a relatively short time in the media content event 204. Accordingly, a new media content event summary segment 202 may be constructed and communicated after a relatively shorter separation duration. For example, the media content event summary segment 202e is communicated in the summary feed stream 108 at a time $T_{202e}$. A subsequent media content event summary segment 202f is communicated at a time $T_{202f}$. The time $T_{202f}$ occurs relatively sooner than the other media content event summary segments 202. That is, the separation duration Te-f is less than the previous separation durations (e.g., Td-e).

In the illustrated sequence of communicated media content event summary segments 202a-k, the next media content event summary segment 202g is communicated at a next regularly scheduled time $T_{202g}$. Accordingly, the exemplary separation duration Tf-g is relatively longer than other separation durations. Alternatively, the separation duration Tf-g maintained at the predefined duration (e.g., Td-e) or may be defined to be any duration of interest.

In the exemplary summary feed stream 108 of FIG. 2, a series of eleven media content event summary segments 202a-202k are communicated during the presentation of the media content event 204. Any number of media content event summary segments 202 may be constructed and communicated for a media content event 204. For example, a media content event 204 having a presentation duration of a half hour is likely to have fewer media content event summary segments 202 than a two-hour long media content event 204.

Further, the characteristics of the media content event 204 may influence the number of media content event summary segments 202. For example, a news broadcast event may have more media content event summary segments 202 than a comparable duration football game as the news report segments may occur more frequently than interesting plays of the football game. As another example, a championship football game may have more media content event summary segments 202, and/or longer duration media content event summary segments 202, than a regular season football match.

Presentation of the media content event summary segments 202 that are temporarily close to the end time (Te) of the media content event 204 may have presentation durations that extent beyond the end time (Te) of the media content event 204. For example, the duration of the media content event summary segments 202h, 202j, and 202k are such that if presented to the user, the media content event summary segments 202h, 202j, or 202k will conclude after the end time (Te) of the media content event 204.

In the exemplary summary feed stream 108 of FIG. 2, the last media content event summary segment 202k is available for presentation at or near the conclusion of the media content event 204 (e.g., at the end time (Te) of the media content event 204). If the user elects to view this particular media content event summary segment 202k, the user will view a series of media content event summaries that summarize the media content events of interest of the media content event 204. Thus, the user may gain an appreciation of the subject matter of the media content event 204 without having to actually view the entire media content event 204. For example, if the media content event 204 is a football game, the user may view the last media content event summary segment 202k as be presented a summary of all of the media content events of interest that occurred during the entire football game. However, the user will not be able to view the football game itself since the broadcast of the football game has concluded (unless the user has recorded the football game on a memory storage device, such as a digital video recorder residing in the media device 102, for example).

As the media content event 204 progresses, the constructed and generated media content event summary segments 202 generally increase in duration. In some embodiments, one or more of the media content event summary segments 202 may overlap with each other. For example, at the end time (Te) of the media content event 204, the media content event summary segments 202h-202k are being concurrently communicated in the summary feed stream 108, as indicated by the circled region 206. That is, communicated media content event summary segments 202 may overlap with each other.

Each of the media content event summary segments 202 may be uniquely identified by a suitable identifier such that when the overlapping media content event summary segments 202 in the summary feed stream 108 are being received by a media device 102, the correct information associated with a particular presented media content event summary segment 202 may be identified in the received summary feed stream 108 such that the identified media content event summary segment 202 may be processed by the media device for communication to the media presentation device 110 (FIG. 1). Examples of suitable identifiers may be their starting time (e.g., the times $T_{202a}$ through $T_{202k}$), an assigned identifier such as a sequence number, a random identifier, or the like.

Further, the summary feed stream 108 may be configured to communicate media content event summary segments 202 for a plurality of different media content events 202. This way, allocated bandwidth (capacity) of the summary feed stream 108 may be more efficiently used. Each of the concurrently communicated media content event summary segments 202 would have unique and suitable identifiers associated with their particular media content event 202. Examples of suitable identifiers of a particular media content event summary segment 202 associated with a media content event 204 may be the title of the media content event 204, a program identifier (PID) of the media content event 204, a channel designation of the media content event 204, a broadcast time and date of the media content event 204, or the like.

In the various embodiments, a media content event summary segment 202 is presented to a user in response to a user request for presentation of the media content event summaries associated with a currently selected media content event 204. For example, FIG. 2 illustrates receipt of a first user request 208a at a time 128. The time 128 corresponds to the time $T_{202d}$, which is at the initial availability of the media content event summary segment 202d in the summary feed stream 108. Accordingly, the media content event summary segment 202d would be retrieved from the received summary feed stream 108 and presented to the user. It is apparent from FIG. 2 that the media content event summary segment 202c is concurrently available at the time $T_{202c}$. However, the media content event summary segment 202c would not include any media content event summaries associated with media content events of interest that occurred during the following duration Tc-d of the media content event 204. Accordingly, it would be relatively undesirable to obtain and present the media content event summary segment 202c since any media content event summaries generated from intervening media content events of interest would not be included in the previously constructed media content event summary segment 202c.

As another example, FIG. 2 illustrates receipt of another user request 208b at a time 136. The time 136 corresponds to a time after the initial availability of the media content event summary segment 202g. In an exemplary embodiment, the media content event summary segment 202g would be retrieved from the received summary feed stream 108 and would be immediately presented to the user. However, it is apparent from FIG. 2 that an initial portion of the media content event summary segment 202g, as indicated by the duration Tb, will not be available for presentation to the user. Thus, the user would miss the initial media content event summaries associated with events of interest that occurred during the duration Tb.

In an exemplary embodiment, the initial portion of the next available media content event summary segment 202h, indicated by the duration Tc, would be retrieved and saved for presentation to the user in the event that the user wishes to view the initial portion of the media content event summaries Alternatively, some embodiments are configured to delay presentation of the media content event summaries until the next media content event summary segment 202h becomes available in the received summary feed stream 108. In such embodiments, presentation of the selected media content event 106 would continue until the media content event summary segment 202h becomes available. Then, sequential presentation of all of the media content event summaries could be made in their correct order of occurrence in the media content event 204. In embodiments where the separation durations between media content event summary segments 202 are relatively short, the delay in the start of the presentation of the next available media content event summary segment 202h may not be distracting and/or undesirable to the user.

In other embodiments, all of or portions of a received media content event summary segment 202 are saved at the media device 102. Further, corresponding portions of the media content event 204 may also be saved at the media device 102. When the user requests presentation of the media content event summaries, the stored media content event summary segment 202 may be immediately retrieved and presented. When presentation of the retrieved media content event summary segment 202 concludes, presentation of the media content event 204 may resume. Presentation of the media content event 204 may resume at various points in time. For example, presentation of the media content event 204 may resume at the point where the user requested the media content event summaries. Alternatively, presentation of the media content event 204 may resume at the time associated with end of the separation duration of the presented media content event summary segment 202. In some embodiments; presentation of the media content event 204 may resume at a user defined point in time.

The starting times of the media content event summary segments 202a-202k may be identified and correlated with the media content event 204 in a variety of manners. In an exemplary embodiment, a trigger is embedded into the media content event 204 which identifies the start of an available media content event summary segment 202 to the receiving media device 102. For example, in response to the user request 208b, the media device 102 would begin sensing for the trigger indicating the initial availability of the media content event summary segment 202h. In response to sensing the trigger associated with the start of the media content event summary segment 202h, the media device 102 would end presentation of the media content event 204, such as by pausing and/or saving the media content event 204 starting at the time $T_{202h}$, and then initiate presentation of the media content event summary segment 202h. The triggers may be embedded in any suitable location in the media content stream 106 and/or the summary feed stream 108. For example, but not limited to, the trigger associated with the media content event summary segment 202h may be located in the metadata stream 118 of the media content stream 106. Alternatively, or additionally, the trigger may reside in a metadata portion of the summary feed stream 108. Alternatively, or additionally, the trigger may be incorporated into selected video frames, such as provided for under various MPEG standards.

In embodiments where the separation durations are predefined, the media device 102 may determine the initial availability of a particular media content event summary segment based on time. For example, a table or the like may be available to the media device 102 that indicates the start times of each of the media content event summary segments 102. Alternatively, a clock counter or the like may be incremented to determine and/or to identify the start times of each of the media content event summary segments 102.

In some embodiments, the media content broadcast facility 104 may communicate a notification to the media device 102 that indicates the availability and/or the start time of each of the media content event summary segments 102. For example, after receiving the user request 208b, the media device 102 may await a notification from the media content broadcast facility 104 that the media content event summary segment 208 is available. In response to receiving the notification from the media content broadcast facility 104, the media device 102 may then end presentation of the media content event 204 (and pause or save the media content event 204), and then initiate presentation of the media content event summaries residing in the media content event summary segment 202h.

Figure 3:
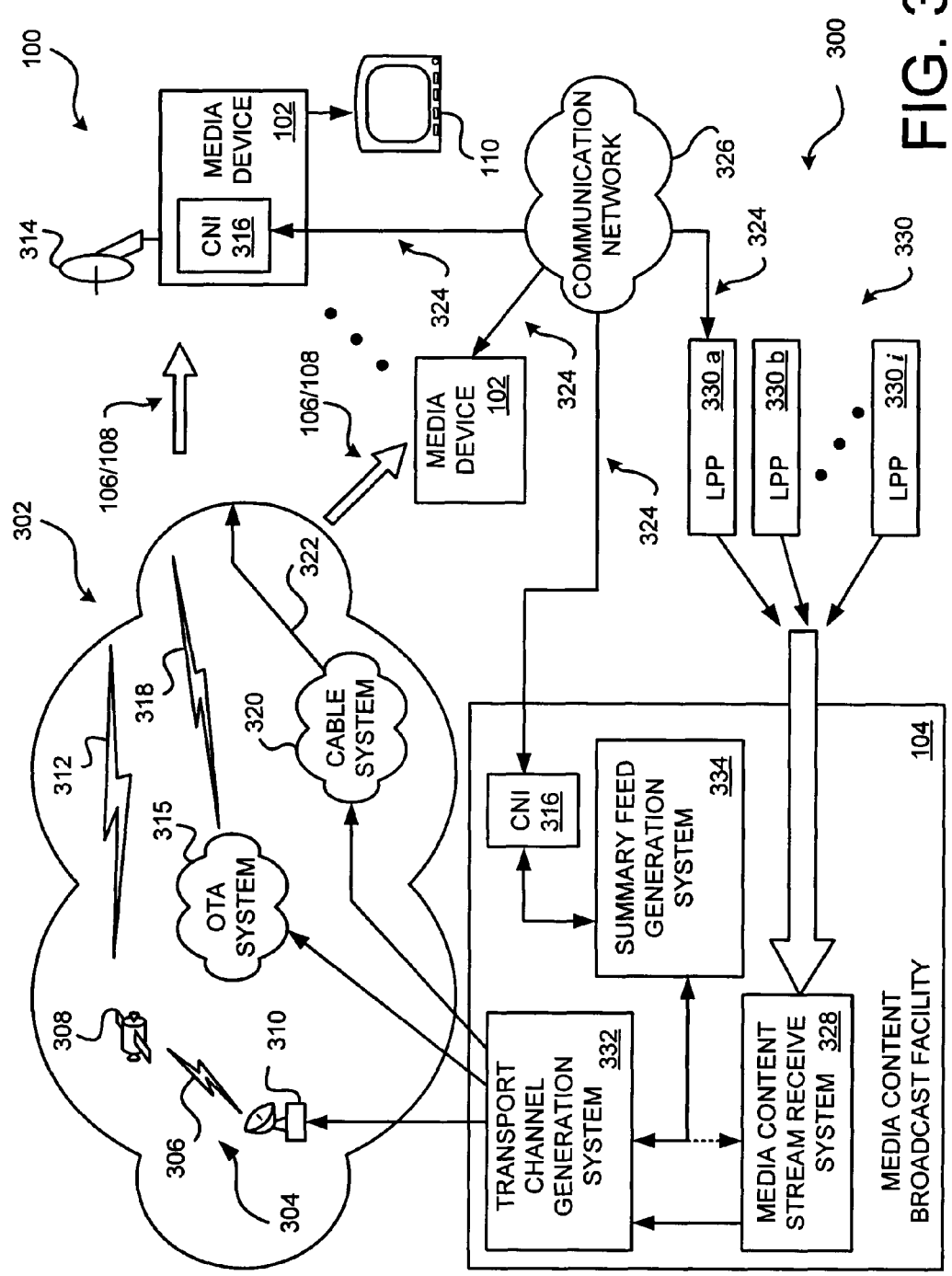
FIG. 3 is a block diagram of an embodiment of the media content event summary feed system implemented in an exemplary broadcast communication environment.

FIG. 3 is a block diagram of an embodiment of the media content event summary feed system 100 implemented in an exemplary broadcast communication environment 300 that comprises a plurality of media devices 102, at least one media content broadcast facility 104, and a broadcast system 302. The media devices 102 are configured to receive the media content stream 106 and the summary feed stream 108 from the media content broadcast facility 104 via the broadcast system 302.

The media content stream 106 comprises a plurality of streamed media content events 204. Some media content broadcast facilities 104 simultaneously broadcast a plurality of media content events 204, even hundreds of broadcast media content events 204, in the media content stream 106. The media device 102, when in operation, is configured by a user to select one of the pluralities of simultaneously broadcast media content events for presentation on a media presentation device 110.

An exemplary broadcast system 302 comprises a satellite broadcast system 304. A plurality of the media content streams 106 reside in a transport channel 306 that is uplinked to a plurality of satellites 308, via a corresponding transmit antenna 310. The respective transport channels are then communicated, in the form of a wireless signal 312, from the plurality of the satellites 308 down to a receiver antenna 314 that is communicatively coupled to the media devices 102. The received wireless signal 312 (with the media content stream 106 and the summary feed stream 108) is then communicated from the receiver antenna 314 to the media device 102. The receiver antenna 314 and the media device 102 may be configured to receive multiple wireless signals 312 from a plurality of satellites 308.

Alternatively, or additionally, the plurality of media content events 204 may be broadcast to the media device 102 via an over the air (OTA) system 315. For example, the media content broadcast facility 104 may be a local program provider (LPP) that broadcasts media content events 204 to the media device 102 using a wireless signal 318. The received wireless signal 318 (with the media content stream 106 and the summary feed stream 108) is received at the receiver antenna 314, or may be received directly by a receiver (not shown) residing in the media device 102.

Alternatively, or additionally, the plurality of media content events 204 may broadcast to the media device 102 via a cable system 320. For example, the media content broadcast facility 104 may employ a coaxial cable and/or fiber optic cable 322 that is coupled to the media device 102. The media content stream 106 and the summary feed stream 108 are received directly by the media device 102.

Alternatively, or additionally, the media content broadcast facility 104 may use an internet protocol television system (not shown) to deliver a one or more media content events 204 to the media device 102 via the OTA system 315, the cable system 320 and/or a communication link 324. The communication on link 324 may be established through a communication network 326. The communication network 326 is illustrated as a generic communication system. In one embodiment, the communication network 326 comprises the Internet. Accordingly, the communication network interface 316 is a modem or other type of Internet communication device. Alternatively, the communication network 326 may be a telephony system, a radio frequency (RF) wireless system, a microwave communication system, a fiber optics system, an intranet system, a local access network (LAN) system, an Ethernet system, a cable system, a cellular system and/or, or a hybrid system comprised of cellular and/or, hybrid system comprised of multiple types of communication media. In such embodiments, a communication network interface (CNI) 316 in the media device 102 and/or in the media content broadcast facility 104 is configured to establish the communication link 324 with the communication network 326 on an as-needed basis, and is configured to communicate over the particular type of communication network 326 that it is coupled to. In some embodiments, portions of the communication network 326 may employ portions of the broadcast system 302.

In some embodiments, the media content stream 106 and the summary feed stream 108 may be separately communicated from the media content broadcast facility 104 to one or more of the media devices 102. For example, but not limited to, the media content stream 106 may be communicated over the broadcast system 302 while the summary feed stream 108 is communicated over the communication network 326.

In some embodiments, the media device 102 established the communication link 324 to the media content broadcast facility 104 in response to receiving the user request to present media content event summaries. The media device 102 may then request the next available media content event summary segment 202 from the media content broadcast facility 104. If a media content event summary segment has been previously constructed and saved, the media content event summary segment 202 may be immediately sent to the requesting media device 102. Otherwise, the next available media content event summary segment 202 may be communicated to the requesting media device 102.

Generation of media content event summaries may be performed at a variety of locations. In an exemplary embodiment, a media content stream receive system 328 may receive one or more media content events 204 from a plurality of local program providers (LPP) 330a-330i. For example, the local program provider 330a may be providing a news cast program and the local program provider 330b may be proving a movie. The media content stream receive system 328 is configured to receive many streaming media content events 204 from a large number of local program providers 330a-330i. The received media content events 204 are then processed into a format that is used by the particular broadcast system 302. Alternatively, or additionally, one or more media content events 204 may be retrieved from a memory medium (not shown). The transport channel generation system 332, in an exemplary embodiment, receives the processed media content events 204 and directs the broadcasting of the media content stream 106 and the summary feed stream 108 to particular destination media devices 102. In some embodiments, the media content stream 106 and the summary feed stream 108 are transported in a single stream of media content.

In embodiments that generate media content event summaries at the media content broadcast facility 104, a summary feed generation system 334 receives the media content events 204 for which a media content event summary segments 202 are to be constructed for. Upon identification of a media content event of interest, the summary feed generation system 334 generates a suitable media content event summary which represents the media content event of interest. The particular media content event summaries may be generated automatically and/or manually by a technician.

Identification of a media content event of interest may be done in a variety of manners. Some embodiments will receive an input from a technician who specifies the media content event of interest. The technician may be reviewing the media content event 204 at a suitable location, and add triggers or other indicators that identify a media content event of interest. For example, the technician may be at a local provider or at the media content broadcast facility 104 reviewing a presented news program broadcast. As another example, the technician may be at the football game and add triggers of other indicators while watching the football game presented on a monitor, or as the game is occurring on the football game playing field.

Alternatively, or additionally, the summary feed generation system 334 may include logic that identifies the occurrence of a media content event of interest. For example, scores of a football game may be monitored to identify a media content event of interest. Audio information, such as the roar of a crown in response to a score at a football game, may be used to identify the occurrence of a media content event of interest.

Alternatively, or additionally, video analysis logic may be used to identify a media content event of interest. For example, a change in scene in a presented news program broadcast may be used to identify the occurrence of a media content event of interest media content event of interest. Any suitable process may be used in the various embodiments to identify the occurrence of a media content event of interest.

Once the occurrence of the media content event of interest has been identified in the media content event 204, a media content event summary is generated. The media content event summary is generated by selecting video frames 122 (FIG. 1) that are in proximity to the time of the identified media content event of interest. Selection of the video frames 122 may be based on any suitable factor. An exemplary embodiment selects video frames 122 based on an input from a technician who specifies the duration, the start of, and/or the end of the media content event of interest. Other embodiments may alternatively, or additionally, employ video and/or audio analysis logic to evaluate characteristics of the media content event 204. The analyzed video and/or audio characteristics may then be used to define the duration, the start of, and/or the end of the media content event of interest.

Based on the identified or defined duration, start of, and/or end of the media content event of interest, the associated video frames 222 may be identified. The identified video frames 222 are then used to generate the video frames 134 of the media content event summary. The media content event summaries may be supplemented with other information, such as video and/or audio information for other sources. For example, a player's biographical information or a close-up image may be added into the media content event summaries of a foot ballgame.

Additionally, or alternatively, the media content event summaries and/or the media content event summary segments 202 may be generated by the local program providers 330. The generated media content event summaries may be communicated to the media content broadcast facility 104 which constructs the media content event summary segments 202. Or, completed media content event summary segments 202 may be communicated to the media content broadcast facility 104. In some embodiments, a requesting media device 102 may establish a communication link 324 to a particular identified local program provider 128 such that the media content event summary segments 202 are directly communicated to the requesting media device 102.

Figure 4:
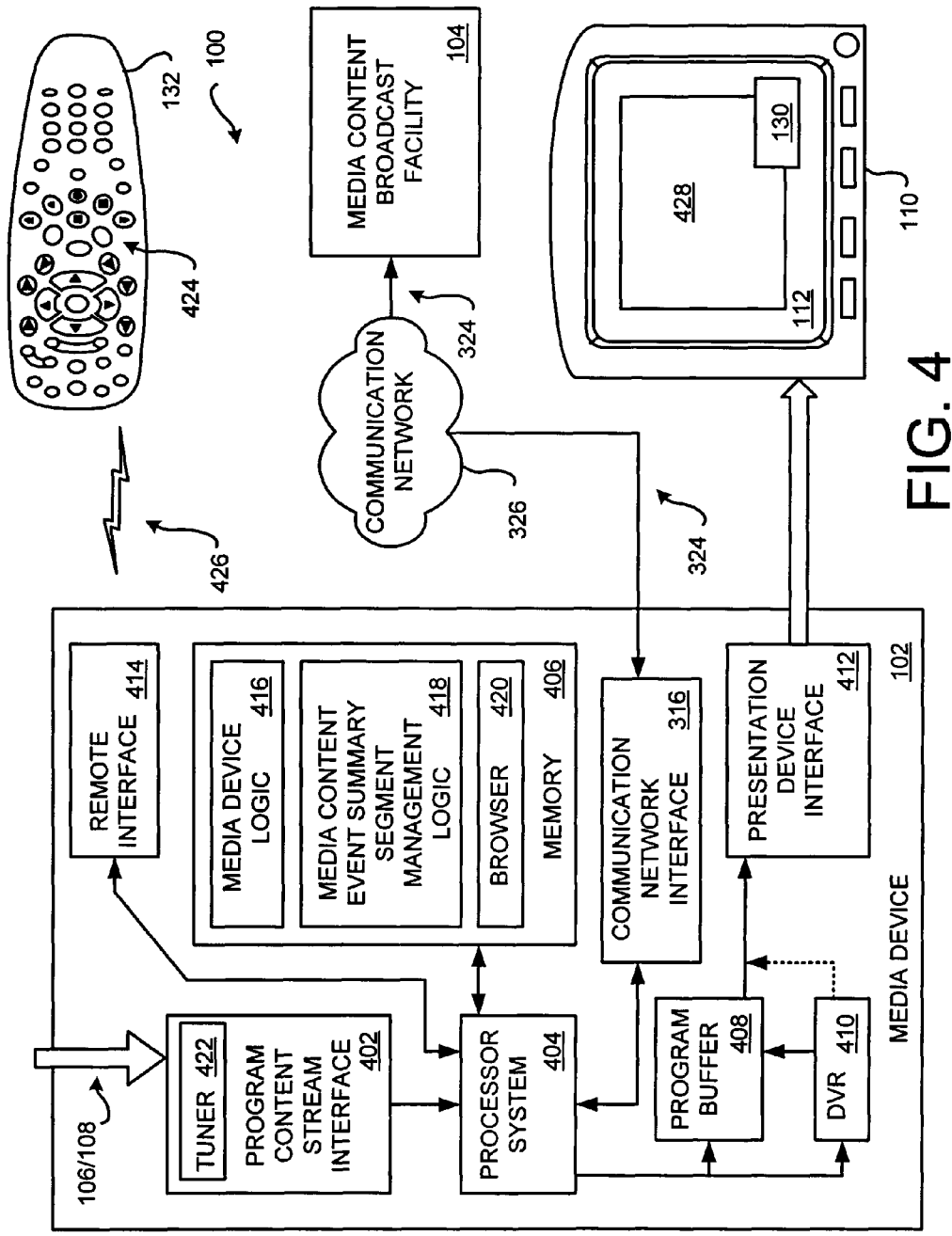
FIG. 4 is a block diagram of an embodiment of a media content event summary feed system implemented in an exemplary media device.

FIG. 4 is a block diagram of an embodiment of a media content event summary feed system 100 implemented in an exemplary media device 102. The non-limiting exemplary media device 102 comprises a media content stream interface 402, a processor system 404, a memory 406, a program buffer 408, an optional digital video recorder (DVR) 410, a presentation device interface 412, a remote interface 414, and the optional communication network interface 316. In some embodiments, the media content stream interface 402 and the communication network interface 316 are integrated into a single component. The memory 406 comprises portions for storing the media device logic 416, the media content event summary segment management logic 418, and an optional browser 420. In some embodiments, the video processing logic 416, the media content event summary segment management logic 418, and/or the browser 420 may be integrated together, and/or may be integrated with other logic. In other embodiments, some or all of these memory and other data manipulation functions may be provided by and using a remote server or other electronic devices suitably connected via the Internet or otherwise to a client device. Other media devices may include some, or may omit some, of the above-described media processing components. Further, additional components not described herein may be included in alternative embodiments As noted above, a viewer (not shown) may specify presentation of a particular media content event of interest. That is, based upon the user commands, the media device 102 can then control itself and the various media devices that it is communicatively coupled to, such as the exemplary media presentation device 110, in accordance with the generated user commands.

The functionality of the media device 102, here a set top box, is now broadly described. A media content provider provides media content that is received in one or more media content streams 106 multiplexed together in one or more transport channels. The summary feed stream 108 may also be multiplexed into the transport channels.

The transport channels with the media content streams 106 and/or the summary feed stream 108 are communicated (broadcast) to the media device 102 from a media system sourced from the remote media content broadcast facility 104 (FIG. 1) operated by the media content provider. Non-limiting examples of such media systems include a satellite system, an OTA system, a cable system, and the Internet.

The one or more media content streams 106 are received by the media content stream interface 402. One or more tuners 422 in the media content stream interface 402 selectively tune to one of the media content streams 106 and/or the summary feed stream 108 in accordance with instructions received from the processor system 404. The processor system 404, executing the media device logic 416 and based upon a request for a media content event of interest specified by a user 124, parses out media content associated with the media content event of interest. The media content event of interest is then assembled into a stream of video and/or audio information which may be stored by the program buffer 408 such that the media content can be streamed out to the media presentation device 110. Alternatively, or additionally, the parsed out media content may be saved into the DVR 410 for later presentation. The DVR 410 may be directly provided in, locally connected to, or remotely connected to, the media device 102.

In an exemplary embodiment, the processor system 404, executing the media content event summary segment management logic 418, parses out one or more of the media content event summary segments 202 received in the summary feed stream 108. The media content event summary segments 202 are then assembled into a stream of video and/or audio information which may be stored by the program buffer 408 such that the media content event summaries can be streamed out to the media presentation device 110, via the presentation device interface 412. Alternatively, or additionally, the parsed out media content event summary segment 202 may be saved into the DVR 410 for later presentation.

The exemplary media device 102 is configured to receive commands from a user via the remote control 132. The remote control 132 includes one or more controllers 424. The user, by actuating one or more of the controllers 424, causes the remote control 132 to generate and transmit commands, via a wireless signal 426, to the media device 102. The commands control the media device 102 and/or control the media presentation devices 110. The wireless signal 426 may be an infrared signal or an RF signal.

One or more of the controllers 424 of the remote control 132 may be configured to generate a command corresponding to the user request for presentation of the media content event summaries. The user, by actuating one or more of the designated controllers 424, causes the remote control 132 to generate and transmit commands, via a wireless signal 426, to the media device 102 so that the media content event summaries in a current media content event summary segment 202 are presented.

The above processes performed by the media device 102 are generally implemented by the processor system 404 while executing the media device logic 416. Thus, the media device 102 may perform a variety of functions related to the processing and presentation of one or more media content events received in the media content stream 106 and/or media content event summaries received in the summary feed stream 108.

Various processes related to the processing of media content event summary segments 202 received in the summary feed stream 108, response to user requests for presentation of the media content event summaries, the subsequent presentation of the media content event summaries, and management of the media content event 204 during presentation of the media content event summaries, is managed under the control of the media content event summary segment management logic 418. For example, media content event summary segments 202 may be stored into the buffer 408 and/or the DVR 410. As another example, when the media content event summaries are being presented on the media presentation device 110, the media content event 204 may be stored into the buffer 408 and/or the DVR 410, wherein presentation of the media content event 204 may resume after presentation of the media content event summaries.

In an exemplary embodiment, the detection of triggers associated with a received media content event summary segment 202, or detection of a received media content event summary segment 202, causes presentation of the summary selection icon 130 on the display 112 of the media presentation device 110. In some embodiments, the summary selection icon 130 may be presented in response to an actuation of one or more of the controllers 424 on the remote control 132.

The summary selection icon 130 may provide various information pertaining to the media content event summary segment 202 and/or any media content event summaries contained therein. For example, a textual summary of the media content event summaries may be presented.

The summary selection icon 130 may be displayed for a predefined duration. In some embodiments, the summary selection icon 130 may be presented during the entirety of the media content event 204. In yet other embodiments, the summary selection icon 130 may be presented at times when a media content event summary segment 202 is available for presentation.

The summary selection icon 130 may be presented on an unused portion of the display 112, may be presented using a picture in picture (PIP) format, using a picture over picture (POP) format, using a scroll bar, side bar, or banner format, or using any other suitable presentation format. Accordingly, images 428 of the media content event 204 may be presented while the summary selection icon 130 is concurrently displayed.

The summary selection icon 130 may be an active icon that is selectable by the user. Upon actuation of one or more of the controllers 424 on the remote control 132, the summary selection icon 130 may be selected such that the media content event summaries for a currently available media content event summary segment 202 are presented.

In some embodiments, the media content event summaries for a currently available media content event summary segment 202 are automatically presented in response to actuation of one or more of the controllers 424 on the remote control 132. In such embodiments, the summary selection icon 130 would not be presented on the display 112.

In some embodiments, one or more of the controllers 424 may be configured to end presentation of the media content event summaries. Accordingly, presentation of the media content event 204 immediately resumes.

In some embodiments, the media content event summaries may be presented concurrently with a continuing presentation of the media content event 204. In this example embodiment, the audio portion of the media content event 204 is muted while the audio portion of the media content event summaries are presented. Accordingly, the user is able to view and hear the media content event summaries while concurrently viewing the video portion of the media content event 204.

In embodiments with the optional communication network interface 316, a communication link 324 may be established with the summary feed generation system 334, via the communication network 326. If the summary feed generation system 334 is configured as an internet site, the browser 420 may be configured to access the summary feed generation system 334 and submit a request for a media content event summary segment 202. Accordingly, the communication network interface 316 may be a modem or other type of Internet communication device.

It should be emphasized that the above-described embodiments of the media content event summary feed system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method comprising:
receiving a media content stream having at least one media content event;
receiving a summary feed stream having a series of media content event summary segments associated with the received at least one media content event,
wherein the beginning of at least one later received media content event summary segment is concurrently received in the summary feed stream with a concluding portion of a previous media content event summary;
receiving a user request for presentation of a current media content event summary segment selected from the series of media content event summary segments;
ending presentation of the media content event on a media presentation device; and
presenting the current media content event summary segment on the media presentation device,
wherein the media content event summary segments comprise media content event summaries that include at least a video clip,
wherein each video clip comprises a plurality of video frames corresponding to a particular event of interest that has occurred in the media content event,
wherein each of the media content event summaries are arranged within their media content event summary segment in a temporal sequence that corresponds to a sequence of the events of interest in the media content event,
wherein a beginning of each one of the series of media content event summary segments are separated by a predefined separation duration, and
wherein a duration of each one of the series of media content event summary segments increase as the media content event is received.

2. The method of claim 1, wherein ending presentation of the media content event comprises:
pausing presentation of the media content event,
and the method further comprising:
resuming presentation of the paused media content event upon conclusion of a presentation of the current media content event summary segment.

3. The method of claim 1, wherein ending presentation of the media content event comprises:
storing presentation of the media content event,
and the method further comprising:
retrieving the stored media content event upon conclusion of a presentation of the current media content event summary segment; and
resuming presentation the retrieved media content event.

4. The method of claim 1, where response to receiving the user request for presentation of media content event summary segment, the method further comprises:
presenting a summary selection icon on the media presentation device; and
receiving a signal from a remote control corresponding to a user selection of the summary selection icon,
wherein the current media content event summary segment is presented on the media presentation device in response to receiving the remote control signal.

5. The method of claim 4, wherein the signal received from the remote control is a first signal, and further comprising:
receiving a second signal from the remote control,
wherein the second signal is received prior to the first signal, and
wherein the summary selection icon is presented in response to receiving the second signal.

6. The method of claim 4, further comprising:
detecting a trigger associated with the at least one received media content event summary segment,
wherein the trigger resides in at least one of the media content stream and the summary feed stream, and
wherein the summary selection icon is presented in response to detecting the trigger.

7. The method of claim 1, further comprising:
establishing a communication link to a summary feed generation system; and communicating a request for the current media content event summary segment over the communication link to the summary feed generation system,
wherein the current media content event summary segment is received over the communication link.

8. The method of claim 1, wherein a first one of the series of media content event summary segments is a first media content event summary segment that associated with a first time of the currently presented media content event, and further comprising:
receiving a second media content event summary segment in the summary feed stream, wherein the second media content event summary segment associated with a second time of the currently presented media content event, wherein the second time is later than the first time,
wherein the user request for the current media content event summary segment is received while the second media content event summary segment is being received such that the second media content event summary segment is presented on the media presentation device, and
wherein the first media content event summary segment is not presented on the media presentation device.

9. The method of claim 1, further comprising:
storing the series of media content event summary segments;
retrieving the current media content event summary segment in response to receiving the user request.

10. The method of claim 1, wherein a first one of the series of media content event summary segments is a first media content event summary segment that is associated with a first time of the currently presented media content event, and further comprising:
continuing presentation of the media content event until a second media content event summary segment begins to be received in the summary feed stream, wherein the second media content event summary segment is associated with a second time of the currently presented media content event that is later than the first time, wherein the second media content event summary segment then becomes the current media content event summary segment;
ending presentation of the media content event in response to receiving the second media content event summary segment; and
presenting media content event summary of the second media content event summary segment.

11. A media device, comprising:
a media content stream interface configured to receive a broadcast media content stream having at least one media content event, and configured to receive a summary feed stream having a series of media content event summary segments associated with the received at least one media content event,
wherein the beginning of at least one later received media content event summary segment is concurrently received in the summary feed stream with a concluding portion of a previous media content event summary;
a remote interface configured to receive a signal from a remote control, where the signal corresponds to a user request for presentation of a current media content event summary segment residing in the received series of media content event summary segments;
a storage medium configured to store the media content event; and
a processor system controllably coupled to the media content stream interface, the remote interface, and the storage medium, wherein the processor system is configured to:
end output of the media content event to a media presentation device in response to receiving the signal corresponding to the user request;
initiate output of the current media content event summary segment to the media presentation device for presentation;
store the media content event into the storage medium; and
upon conclusion of the presentation of the current media content event summary segment, retrieve the stored media content event from the storage medium resume output of the media content event to the media device for presentation,
wherein the media content event summary segments comprise media content event summaries that include at least a video clip,
wherein each video clip comprises a plurality of video frames corresponding to a particular event of interest that has occurred in the media content event,
wherein each of the media content event summaries are arranged within their media content event summary segment in a temporal sequence that corresponds to a sequence of the events of interest in the media content event,
wherein a beginning of each one of the series of media content event summary segments are separated by a predefined separation duration, and
wherein a duration of each one of the series of media content event summary segments increase as the media content event is received.

12. The media device of claim 11, wherein the media content stream interface further comprises:
a communication network interface that is configured to establish a communication link to a summary feed generation system via a communication network,
wherein the processor is further configured to communicate a request over the communication link for the series of media content event summary segments, and
wherein at least the current media content event summary segment is received over the established communication link.

13. A method comprising:
broadcasting a media content stream having at least one media content event to a plurality of media devices; and
communicating a summary feed stream to at least one of the plurality of media devices,
wherein the summary feed stream comprises a series of media content event summary segments associated with the at least one media content event,
wherein the media content event summary segments comprise media content event summaries that include at least a video clip,
wherein each video clip comprises a plurality of video frames corresponding to a particular event of interest that has occurred in the media content event;
wherein each of the media content event summaries are arranged within their media content event summary segment in a temporal sequence that corresponds to a sequence of the events content event,
wherein a beginning of each one of the series of media content event summary segments are separated by a predefined separation duration, wherein a duration of each one of the series of media content event summary segments increase as the media content event is received, and wherein the beginning of at least one later received media content event summary segment is concurrently received in the summary feed stream with a concluding portion of a previous media content event summary.

14. The method of claim 13, further comprising:

establishing a communication link with the at least one media device; and receiving a request from the at least one media device for a current media content event summary segment, wherein the current content event summary segment is communicated to the at least one media device in response to receiving the user request.

15. The method of claim 13, further comprising:

constructing each one of the series of media content event summary segments based on a plurality of portions of the at least one media content event of interest.

16. The method of claim 15, wherein constructing at least one of the media content event summary segments comprises:

generating a first media content event summary associated with a first portion of interest of the at least one media content event;

generating a second media content event summary associated with a second portion of interest of the at least one media content event;

adding the first media content event summary into the media content event summary segment; and adding the second media content event summary into the media content event summary segment.

17. The method of claim 16, wherein constructing a second one of the media content event summary segments further comprises:

generating a third media content event summary associated with a third portion of interest in the at least one media content event, wherein the third media portion of interest occurs after the second media content event of interest;

adding the third media content event summary into the media content event summary segment after the first media content event summary and the second media content event summary.

18. The method of claim 16, wherein one of the series of media content event summary segments is a first media content event summary segment, and further comprising:

communicating the first media content event summary segment in the summary feed stream; and after communicating the first media content event summary segment, constructing a second media content event summary segment, wherein constructing the second media content event summary segment comprises:

adding the first media content event summary and the second media content event summary into the second media content event summary segment;

generating a third media content event summary associated with a third portion of interest in the at least one media content event, wherein the third portion of interest occurs after the second portion of interest;

adding the third media content event summary into the second media content event summary segment after the first media content event summary and the second media content event summary; and communicating the second media content event summary segment in the summary feed stream.

\* \* \* \* \*